United States Patent [19]

Aoki

[11] Patent Number: 4,768,735
[45] Date of Patent: Sep. 6, 1988

[54] CLUTCH MECHANISM FOR REEL HAVING SPOOL SHAFT SUPPORTED AT BOTH ENDS

[75] Inventor: Atsuhito Aoki, Fuchu, Japan

[73] Assignee: Ryobi, Ltd., Hiroshima, Japan

[21] Appl. No.: 68,524

[22] Filed: Jul. 1, 1987

[30] Foreign Application Priority Data

Jul. 2, 1986 [JP] Japan ................ 61-102466

[51] Int. Cl.⁴ .......................................... A01K 89/015
[52] U.S. Cl. .................... 242/220; 192/93 A
[58] Field of Search ............ 242/211, 212, 217, 218, 242/219, 220, 221; 192/93 A, 89 A; 74/405

[56] References Cited

U.S. PATENT DOCUMENTS

| | | | |
|---|---|---|---|
| 4,281,808 | 8/1981 | Noda | 242/220 X |
| 4,341,366 | 7/1982 | Kawada | 242/220 |
| 4,379,530 | 4/1983 | Kobayashi | 242/220 |
| 4,406,427 | 9/1983 | Murakami | 242/218 |
| 4,575,024 | 3/1986 | Kaneko | 242/220 X |
| 4,593,869 | 6/1986 | Yasui et al. | 242/220 |
| 4,697,760 | 10/1987 | Aoki | 242/220 |

FOREIGN PATENT DOCUMENTS 78526  5/1985  Japan .................... 242/220

Primary Examiner—Stuart S. Levy
Assistant Examiner—Joseph J. Hail, III
Attorney, Agent, or Firm—Finnegan, Henderson, Farabow, Garrett & Dunner

[57] ABSTRACT

In the clutch mechanism, a substantially V-shaped kick claw having first and second claw portions is rotatably and vertically movable. It is supported between a ratchet and a clutch cam. The engagement position of the clutch cam is switched by direct operation from the ratchet through the kick claw to enable the reduction of the sizes of the clutch cam and the kick claw and to enable the clutch mechanism and the reel to be significantly more compact. Since both the slidably supported ends of a clutch bar and the center of a pinion are located on the same imaginary straight line, clutch engagement and clutch disengagement can be smoothly changed. A feeling of click action in the change can be provided.

5 Claims, 5 Drawing Sheets

CLUTCH MECHANISM FOR REEL HAVING SPOOL SHAFT SUPPORTED AT BOTH ENDS

BACKGROUND OF THE INVENTION

1. Field of the Invention

The present invention relates to a clutch mechanism for a fishing reel having a spool shaft supported at both of the ends thereof.

2. Description of the Prior Art

A spool, on which a fishline is wound, and a handle for rotating the spool are connected to, or disconnected from, each other by a clutch mechanism to transmit or cut off rotary power. The spool and the handle can be automatically connected to each other by rotating the handle in a forward direction to wind the fishline on the spool.

A conventional clutch mechanism of such kind comprises a pinion engaged with a drive gear. The pinion is axially slidable and rotatable on the spool shaft when the pinion is coupled to a notched circular portion of the spool shaft. The pinion is fitted on the clutch bar so that the pinion can be slid in the axial direction thereof. A clutch cam is provided between the clutch bar and the side plate of the body of a reel and is coupled to an operating member. The drive gear is rotated by a handle. The pinion and the spool shaft are uncoupled from each other by the clutch cam. The pinion and the spool shaft are coupled to each other in conjunction with the movement of a ratchet.

In a clutch mechanism disclosed in the Japanese Patent Application (OPI) No. 78526/85 (the term "OPI" as used herein means an "unexamined published application"), a kick claw is movably connected to a ratchet and a clutch cam, but the ratchet and the kick claw are movingly connected to each other through another member such as a pin and the kick claw is moved rightward and leftward. For that reason, a large disposition space needs to be provided between the clutch cam and the ratchet and, as a result, the clutch mechanism and a reel cannot be made compact.

In a conventional clutch mechanism shown in FIG. 12, an engaged clutch is disengaged by a lever (a), and the disengaged clutch is engaged either manually by the lever (a) or automatically by a ratchet (b) and a kick claw (c). In the case of automatic engagement, the ratchet (b) is rotated, one end of the kick claw (c) is pushed by a kick pin (d), the kick claw is slid. The other end of the kick claw pushes the recessed portion (e') of a clutch cam (e), and the clutch cam and the lever (a) are turned clockwise, so that clutch engagement is performed. However, because the projection (g) of the body (f) of a reel is fitted in the slender hole (h) of the kick claw (c) to make the kick claw slidable and also needs to extend at one end of a clutch bar (i), the projections (3) slidably supporting the clutch bar (i) at both the ends thereof and the center of a pinion (k) are not located on the same imaginary straight line. For that reason, there are problems that the clutch bar (i) is likely to be inclined at the time of the sliding of the kick claw during both manual engagement and the automatic engagement so as to prevent smooth operation during each change. Also, the movement of the clutch bar is large because the clutch cam (e) and the clutch bar are integrated with each other.

SUMMARY OF THE INVENTION

It is an object of the present invention to provide a compact clutch mechanism for a reel having a spool shaft supported at both ends.

This and other objects are accomplished by a clutch mechanism for a reel comprising frame means for supporting components of the reel in an operative arrangement, a spool on which fishline can be wound, a spool shaft supported at both ends thereof, the spool shaft being connected to and rotatable with the spool, a handle connected to rotate the spool shaft, a pinion, control means for selectively engaging the pinion to rotate the spool shaft, the control means including a cam means rotatably mounted on the frame for rotating relative to the pinion to engage and disengage the pinion and spool shaft, spring means urging the cam means to a position for moving the pinion into engagement with the spool shaft, ratchet means having a plurality of teeth disposed on the outer periphery thereof connected to the handle, and a kick claw means adjacent the cam means and the ratchet, the kick claw means having a first claw portion and a second claw portion, the second claw portion being in engagement with the cam means for permitting the first claw portion to engage with a tooth of the ratchet means, the first and second claw portions extending at an angle relative to each other toward the respective cam and ratchet means substantially less than 180 degrees to form a substantially V-shaped configuration, the kick claw means also having a spring means urging the first claw portion into engagement with a notch of the ratchet means.

BRIEF DESCRIPTION OF THE DRAWINGS

The manner by which the above objects and other objects, features, and advantages of the present invention are attained will be fully apparent from the following detailed description when it is considered in view of the drawings, wherein.

DETAILED DESCRIPTION

Figure 1:
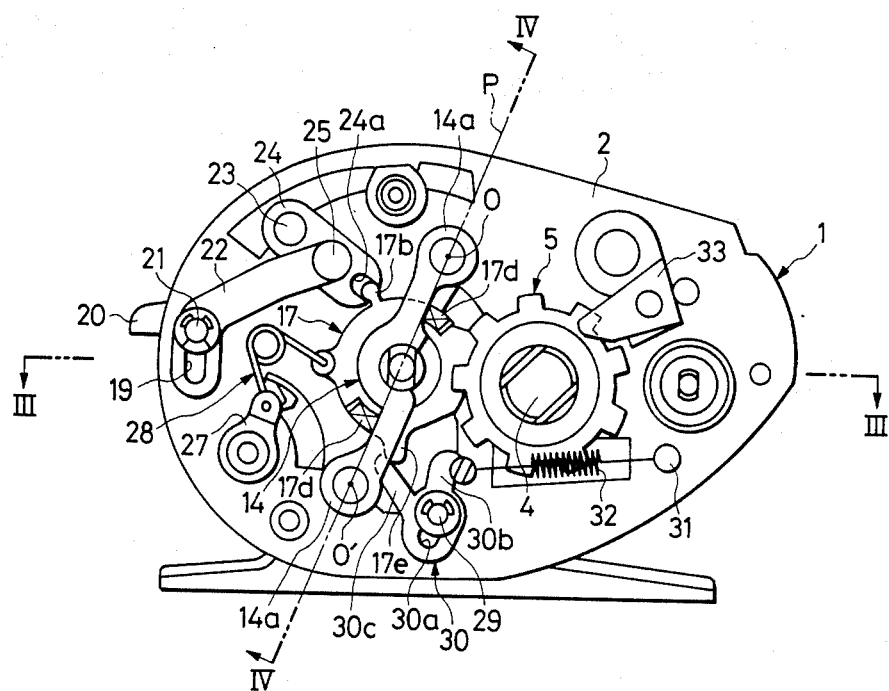
FIG. 1 shows a front view of an embodiment of the present invention, which is a clutch mechanism for a reel having a spool shaft supported at both the ends thereof.
Figure 2:
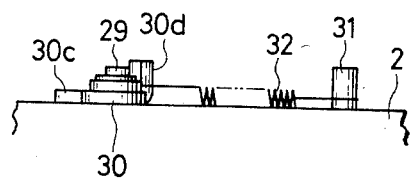
FIG. 2 shows a side view of a kick claw.

In the clutch mechanism, a substantially V-shaped kick claw having first and second claw portions is rotatably and vertically movable. It is supported between a ratchet and a clutch cam. The engagement position of the clutch cam is switched by direct operation from the ratchet through the kick claw to enable the reduction of the sizes of the clutch cam and the kick claw and to enable the clutch mechanism and the reel to be significantly more compact. Since both the slidably supported ends of a clutch bar and the center of a pinion are located on the same imaginary straight line, clutch engagement and clutch disengagement can be smoothly changed. A feeling of click action in the change can be provided.

The pinion, which is engaged with a drive gear on a handle shaft, is slid on the spool shaft in the axial direction thereof by the clutch cam and the clutch bar. The clutch cam is urged by a dead point spring to turn the clutch cam either in a rightward direction or in a leftward direction. When the clutch cam is turned in one of the directions, an operating member uncouples the pinion from the spool shaft which disconnects the handle and the spool shaft from each other. The clutch cam is turned in the other of said directions by the rotation of the ratchet movingly connected to the handle, to couple the pinion to the spool shaft to connect the handle and the spool shaft to each other. A substantially V-shaped kick claw having a spring bearer and a second claw portion is provided on the side plate of the body of the reel between the clutch cam and the ratchet such that the kick claw can be turned and be vertically moved. The spring bearer is provided on the first claw portion and can be either engaged with, or disengaged from, the ratchet. The spring bearer acts to push the projection of the clutch cam in such a direction as to engage the clutch. The second claw portion acts to keep the first claw portion disengaged from the ratchet. A kick claw spring urges the kick claw in such a direction as to engage the kick claw with the ratchet. As a result, the above-mentioned problems are solved.

The spring bearer provided on the first claw portion, which can be engaged with the ratchet in the state of the clutch disengagement, causes clutch engagement by directly pushing and turning the clutch cam by the rotation of the ratchet. The second claw portion is pushed by the projection of the clutch cam to turn the kick claw against the force of the kick claw spring. This keeps the kick claw downward against the force of the kick claw spring to keep the kick claw out of the locus of the rotation of the ratchet and prevent the spring bearer from being engaged in the notch of the ratchet. The kick claw will not affect the rotation of the clutch cam even when the spring bearer comes into contact with the tooth of the ratchet. Since the spring bearer is engaged in the notch of the ratchet by the rotation of the handle at the time of kicking, the clutch engagement and disengagement are made smooth and sure. Since the kick claw is substantially V-shaped and compact and an additional component part for movingly connecting the kick claw is not needed, the clutch mechanism and the reel can be made compact. Since the disposition space for the kick claw is small, both the slidably supported ends of the clutch bar and the center of the pinion can be located on the same imaginary straight line making the clutch engagement and disengagement smooth and sure. Since the number of the component parts of the clutch mechanism is reduced and the constitution of the mechanism is simpler, the mechanism can be manufactured at a lower cost.

An embodiment of the present invention, which is a clutch mechanism for a reel, is hereafter described in detail with reference to the drawings attached hereto.

Figure 5:
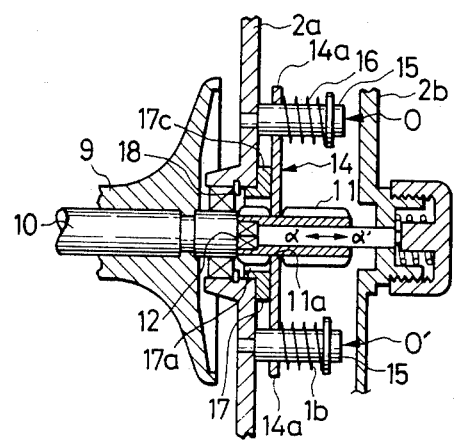
FIG. 5 shows a sectional view along a line IV—IV shown in FIG. 1.

A ratchet 5 is provided on a handle shaft 4 rotatably supported by a support shaft 3 on the side plate 2a of the body 1 of the reel. A driving gear 8 is provided on a drag means 7 between the ratchet 5 and a drag star handle 6 that is screw-engaged with the handle shaft 4. A pinion 11 is engaged with the drive gear 8 and fitted on a spool shaft 10 supporting a spool 9, so that the pinion can be slid in its axial direction shown by arrows (a) and (a') in FIG. 5. The pinion 11 can be coupled to, or uncoupled from, the notched circular portion 12 of the spool shaft 10 to transmit or cut off motive power between the spool shaft and a handle 13.

A clutch bar 14 is engaged in an annular recess provided in the peripheral portion of the pinion 11. Guide pins 15 provided in the side plate 2a of the side frame 2 of the reel body 1 are inserted in arms 14a, symmetrically project from the clutch bar 14, and are resiliently urged toward the side plate 2a by springs 16 provided on the guide pins. Both the end points 0 and 0' of the clutch bar 14, which are slidably supported by the guide pins 15, and the center of the pinion 11 are located on the same imaginary straight line (p).

A clutch cam 17 is provided between the clutch bar 14 and the side plate 2a. The central cylindrical portion 17a of the clutch cam 17 is fitted between the pinion 11 and the inside surface of the through hole 18 of the side plate 2a so that the clutch cam can be rotated.

A push lever shaft 21 provided in the push lever 20 is slidably fitted in the slender hole 19 of the side plate 2a. One end of an interlocking lever 22 is pivotally coupled to the push lever shaft 21. The other end of the interlocking lever 22 is pivotally coupled by a pin 25 to nearly the central portion of another interlocking lever 24 that is pivotally coupled by a pin 23 to the side plate 2a. A projection 17b extending from the clutch cam 17 outward in the radial direction is fitted in the recess 24a of the tip portion of the interlocking lever 24. As a result, the clutch cam 17 can be rotated counterclockwise from a position shown in FIG. 1, by pushing down the lever 20.

Figure 4:
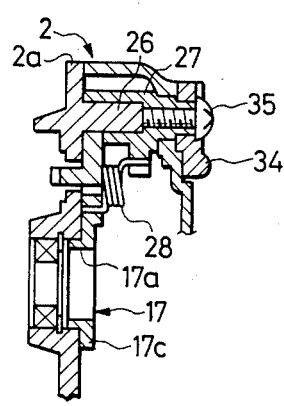
FIG. 4 shows a longitudinal sectional view of a flipping mechanism.
Figure 6:
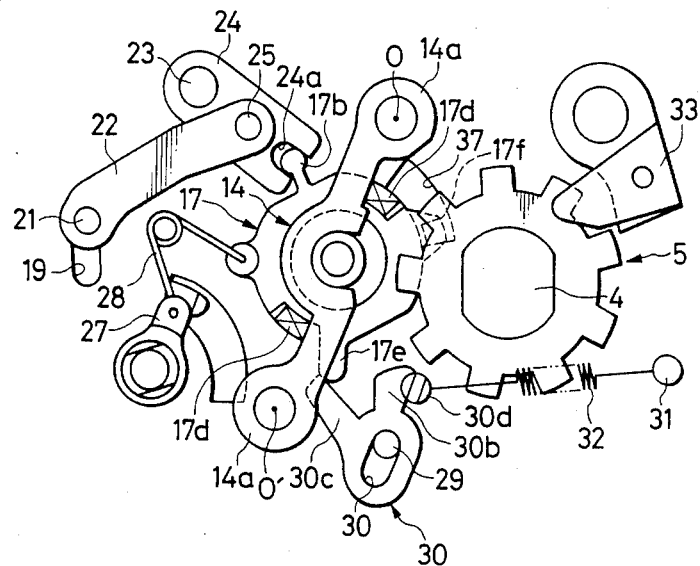
FIGS. 6, 7, 8, 9, 10 and 11 show views for describing the operation of changing clutch engagement and clutch disengagement for each other in the embodiment.

A dead point spring 28 is engaged at both the ends thereof with the clutch cam 17 and a flipping cam 27 is rotatably fitted on the projection 26 of the side plate 2a as shown in FIG. 4, and urges the clutch cam 17 to turn the clutch cam either in a rightward direction or in a leftward direction. When the clutch cam 17 is turned slightly over the dead point of the dead point spring 28, the clutch cam is held in a clutch engagement position shown in FIGS. 1 and 6 or in a clutch disengagement position shown in FIG. 8.

Cam operation parts 17d, the length of the displacement of each of which is substantially larger than the coupled length of the pinion 11 to the notched circular portion 12 of the spool shaft 10, are provided in mutually symmetrical positions on the annular portion 17c of the clutch cam 17 and obliquely project in the axial direction of the clutch cam. When the clutch cam 17 is turned, the arms 14a of the clutch bar 14 engage the cam operation parts 17d to move the clutch lever 14 by the length of the displacement together with the pinion 11 in the direction of the arrow (a') in FIG. 5 to uncouple the pinion 11 and the notched circular portion 12 of the spool shaft 10 from each other. As a result, the handle 13 and the spool shaft 10 are disconnected from each other so that a state of clutch disengagement is established as shown in FIG. 8.

A kick claw shaft 29, that is provided between the clutch cam 17 and the ratchet 5 and projects from the side plate 2a, is fitted in the slender hole 30a of a kick claw 30 so that the kick claw is rotatably supported by the side plate 2a.

The kick claw 30 is substantially V-shaped and has a spring bearer 30d and a second claw portion 30c. The spring bearer 30d is provided on a first claw portion 30b and can be either engaged with, or disengaged from, the ratchet 5. A projection 17e extending from the clutch cam 17 in the radial direction thereof is pushed by the first claw portion 30b to actuate the clutch cam from the clutch disengagement position toward the clutch engagement position. The second claw position 30c is pushed by the projection 17e of the clutch cam 17 in a state of clutch engagement so that the spring bearer 30d is kept disengaged from the ratchet 5. The ends of a kick claw spring 32 are engaged on the spring bearer 30d and another spring bearer 31 projecting from the side plate 21. The kick claw spring 32 resiliently urges the kick claw 30 in a direction as to engage the spring bearer 30 with the ratchet 5.

Figure 8:
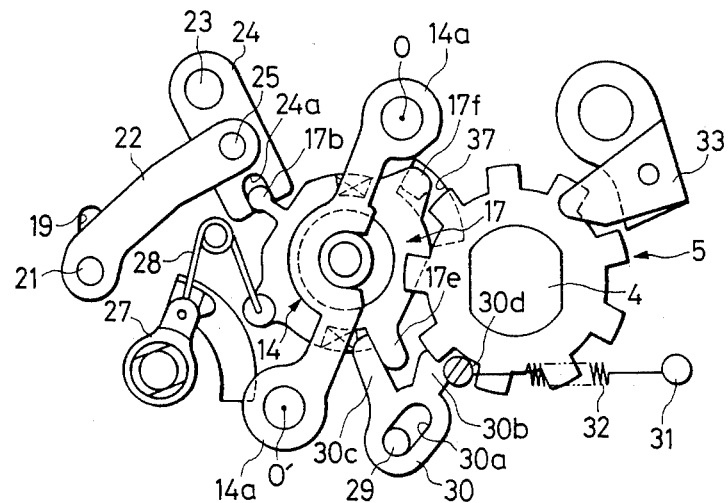

Shown at 33 in FIG. 8 is an anti-reversing cam.

FIG. 4 shows a flipping mechanism. A flipping lever 34 for changeover is secured to the flipping cam 37 by a screw 35.

Figure 3:
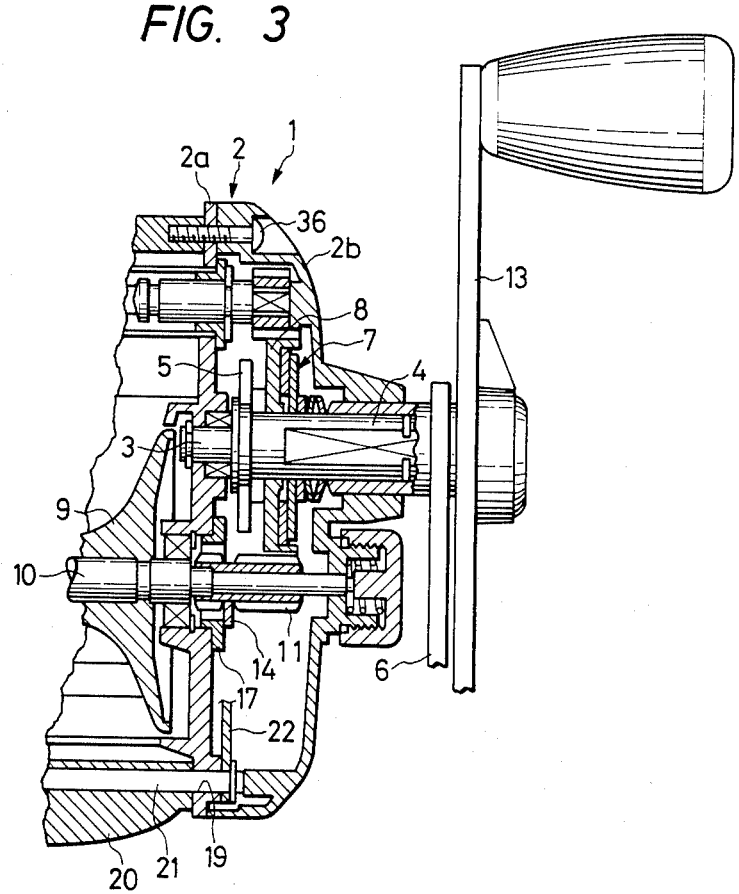
FIG. 3 shows a sectional view along a line III—III shown in FIG. 1.

A right side frame 2 shown in FIG. 3 and a left side frame not shown in the drawings are coupled to each other a prescribed distance to constitute the body 1 of the reel. A spool 9 is rotatably supported between both the side frames. A lid plate 2b is secured to the outside of the side plate 2a by a screw 36 to constitute the hollow side frame 2.

Shown at 37 and 17f in FIGS. 6, 7, 8, 9, 10 and 11 is a slender hole provided in the side plate 2a to set the rotational position of the clutch cam 17, and a rotational position setting projection extending from the clutch cam and fitted in the slender hole, respectively.

Figure 7:
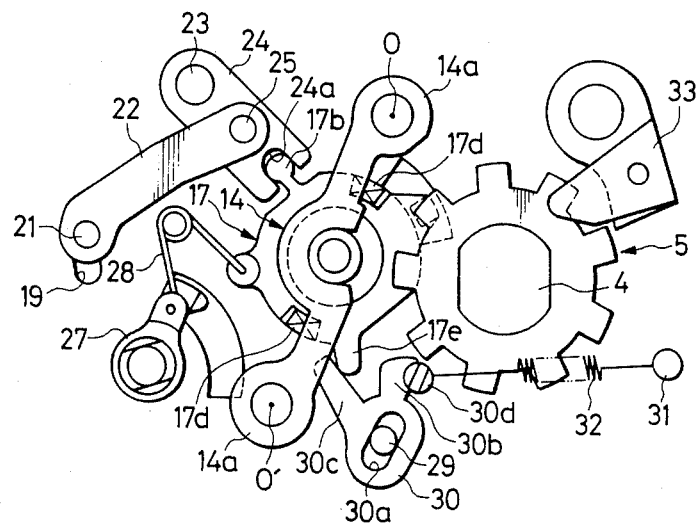

The operation of the clutch mechanism having the above-described constitution is now described with reference the FIGS. 6, 7, 8, 9, 10 and 11. When the push lever 20 shown in FIG. 1 is pressed down in the state of clutch engagement shown in FIG. 6, the clutch cam 17 is turned counterclockwise through the interlocking levers 22 and 24. The pinion 11 and the spool shaft 10 are uncoupled from each other by the clutch bar 14 moved in the axial direction of the reel by the cam operation parts 17d of the clutch cam, so that the state of clutch disengagement is established as shown in FIG. 8. At that time, the projection 17e of the clutch cam 17, which has been pushing the second claw portion 30c of the kick claw 30 counterclockwise as to FIG. 1, is also turned so that the kick claw 30 is turned clockwise about the kick claw shaft 29 by the kick claw spring 32 while being moved up. The spring bearer 30d provided on the first claw portion 30b becomes engaged with the ratchet 5, as shown in FIGS. 7 and 8. In that case, even if the spring bearer 30d is not engaged in the notch of the ratchet 5 but bears against the tooth of the ratchet, the kick claw 30 does not affect the turning of the clutch cam 17, but is engaged therewith due to the turning of the ratchet at the time of kicking, so that clutch engagement is smoothly performed.

Figure 9:
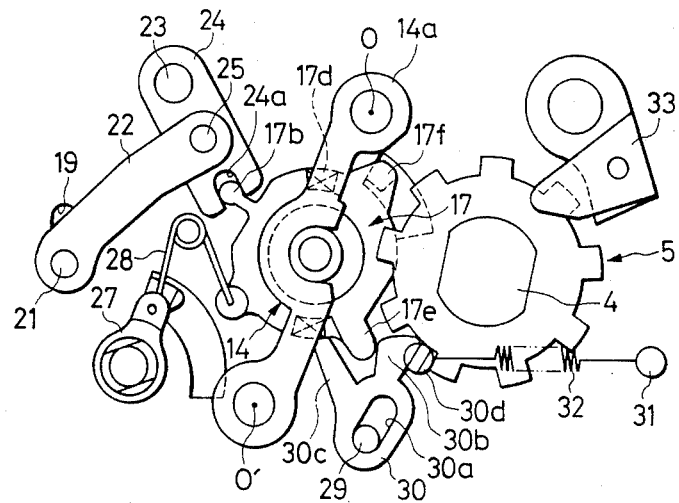
Figure 10:
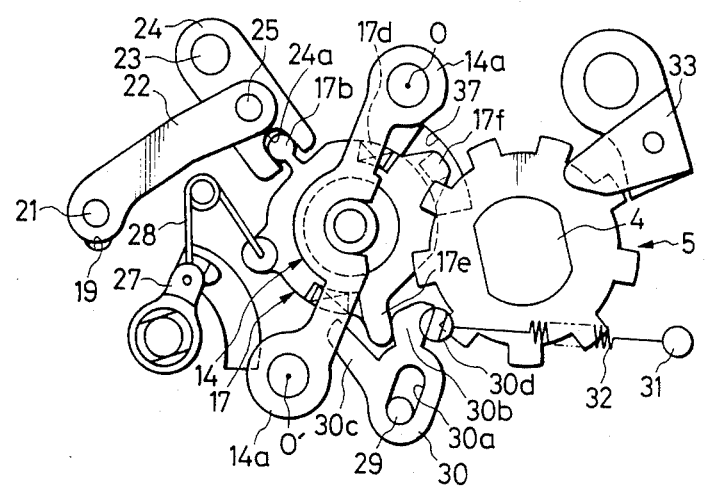
Figure 11:
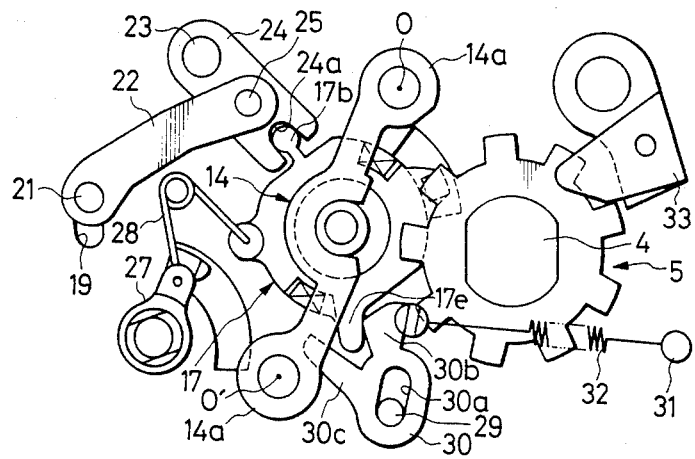
Figure 12:
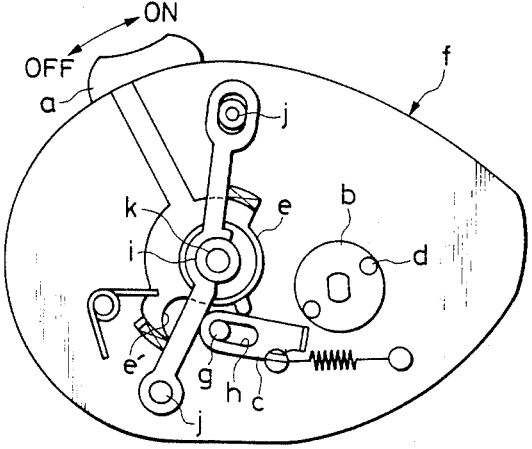
FIG. 12 shows a front view of a conventional clutch mechanism.

When the state of clutch disengagement shown in FIG. 8 is to be changed for that of clutch engagement shown in FIG. 1, the ratchet 5 is turned clockwise (as to the drawings) by the handle 13. A projection on the ratchet 5 causes the spring bearer 30d to turn the kick claw 30 counterclockwise so that the side of the first claw portion 30b opposite the spring bearer 30d comes into contact with the projection 17e of the clutch cam 17, as shown in FIG. 9, and pushes the proJection as shown in FIG. 10. As a result, the clutch cam 17 is turned clockwise, by the first claw portion 30b, to a position slightly beyond the dead point of the dead point spring 28 immediately before the spring bearer 30d provided on the first claw portion 30b goes off the projection of the ratchet 5, as shown in FIG. 11. After that, the clutch cam 17 is turned clockwise further to a prescribed position by the dead point spring 28 so that the cam operation part 17d stops pushing the clutch bar 14. Consequently, the clutch bar 1 is moved in the direction of the arrow (a) in FIG. 5 together with the pinion 11 by the springs 16 so that the pinion and the spool shaft 10 are coupled to each other, thus automatically reestablishing the state of clutch engagement shown in FIG. 6. At that time, the projection 17e of the clutch cam 17 is also turned clockwise to push the second claw portion 30c to turn the kick claw 30 counterclockwise while moving it down from a position shown in FIG. 11. As a result, the spring bearer 30d provided on the first claw portion 30b is put out of the locus of the rotation of the ratchet 5 and kept in a position shown in FIG. 6.

I claim:

1. A clutch mechanism for reel comprising:
   frame means for supporting components of said reel in an operative arrangement;
   a spool on which fishline can be wound;
   a spool shaft supported at both ends thereof, said spool shaft being connected to and rotatable with said spool;
   a handle connected to rotate said spool shaft;
   a pinion;
   control means for selectively engaging said pinion to rotate said spool shaft, said control means including a cam means rotatably mounted on said frame for rotation relative to said pinion to engage and disengage said pinion and spool shaft, said cam means having at least one projection extending radially therefrom;
   first spring means urging said cam means to a position for moving said pinion into engagement with said spool shaft;
   ratchet means having a plurality of teeth disposed on the outer periphery thereof connected to said handle;
   a kick claw means adjacent said cam means and said ratchet, said kick claw means having a first claw portion engageable with said ratchet means and a second claw portion engageable by said projection, said second claw portion which when pressed by said projection maintains said first claw portion out of engagement with said ratchet means, said first and second claw portions extending toward said ratchet means and said projection, respectively, and extending at an angle relative to each other substantially less than 180 degrees to form a substantially V-shaped configuration, said kick claw means also having a second spring means urging said first claw portion into engagement with said ratchet means wherein said kick claw means has an elongated slot and a pin, fixedly mounted relative to the frame, extending into said slot for rotatably and slidably mounting the kick claw.

2. The clutch mechanism as defined in claim 1, wherein the second spring means is connected to the first claw portion.

3. The clutch mechanism as defined in claim 1, wherein the ratchet means has a plurality of rectangular teeth adjacent the periphery edge.

4. The clutch mechanism as defined in claim 1, wherein said cam means includes a straight clutch bar having two symmetrical projecting arms, each of said arms having an end point slidably supported by said frame and wherein said pinion has a longitudinal center arranged along a straight line between said end points.

5. The clutch mechanism as defined by claim 1, wherein said frame means includes a side plate and wherein said kick claw means is rotatably and slidably supported by said side plate.

* * * * *